Dec. 20, 1955 W. F. JENKINS 2,727,427
APPARATUS FOR PRODUCTION OF LIGHT
EFFECTS IN COMPOSITE PHOTOGRAPHY
Filed March 3, 1952
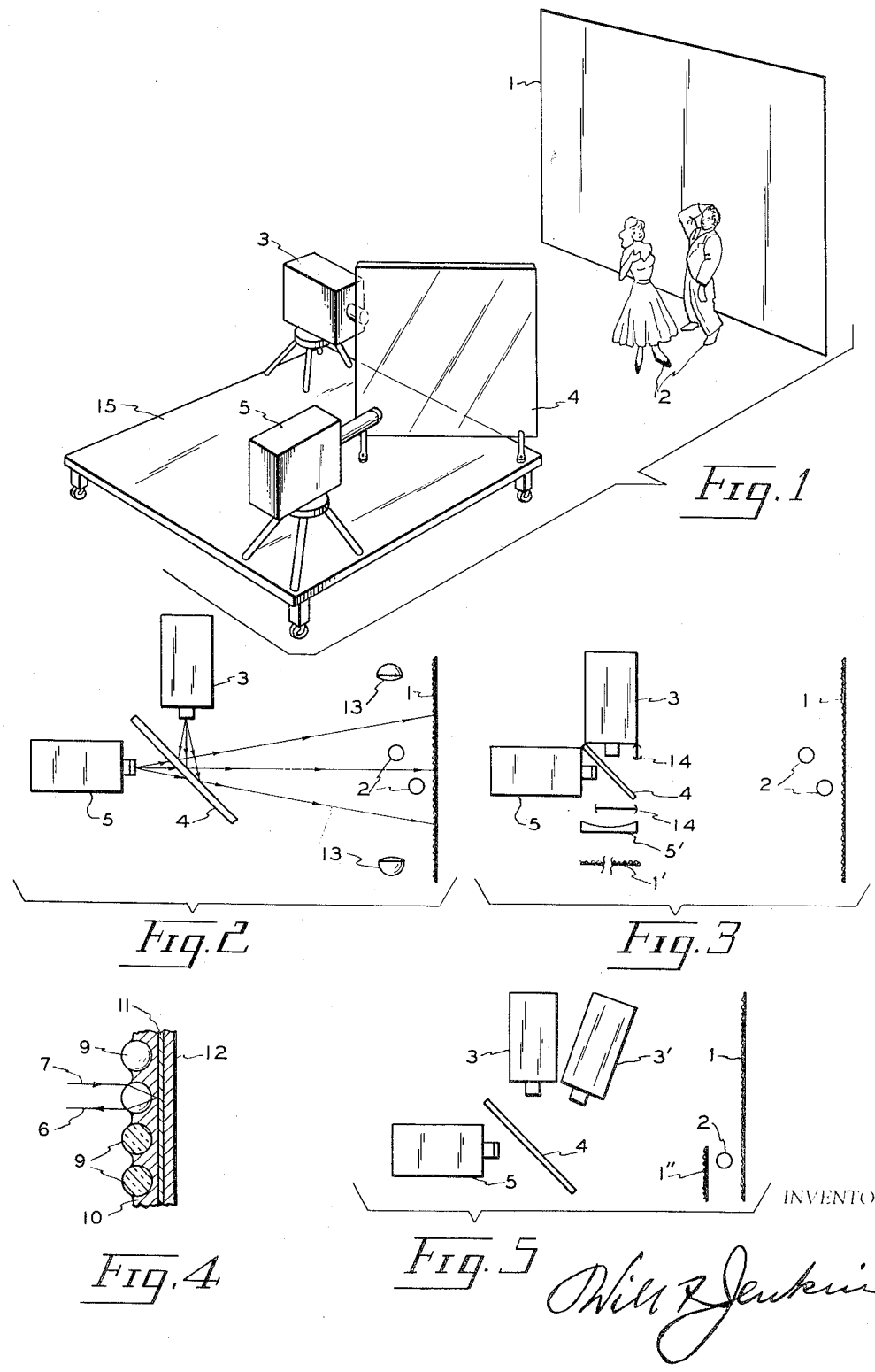
INVENTOR
Will F Jenkins

United States Patent Office 2,727,427
Patented Dec. 20, 1955

2,727,427

APPARATUS FOR PRODUCTION OF LIGHT EFFECTS IN COMPOSITE PHOTOGRAPHY

Will F. Jenkins, Gloucester, Va.

Application March 3, 1952, Serial No. 274,638

8 Claims. (Cl. 88—16)

This invention relates to apparatus for the production of light effects. More particularly it relates to apparatus for the production of television shows, or motion picture shows. More particularly it relates to apparatus whereby the building, handling, and maintenance of stage scenery may be largely dispensed with.

The handling of scenery has always been a major problem in the staging of any kind of show. The advent of television made the problem even worse since live scenes can not be repeated and corrected. Furthermore split-second timing is often necessary in staging a quarter-hour or half-hour television show hence the cost of handling scenery can be enormous. The advertiser pays the cost of the show, but the high cost of television productions has made the medium too expensive for many advertisers. Reduction or elimination of constructed scenery has, up to now, lowered the quality of the show. Thus the progress of television broadcasting has been seriously impeded.

The prior art offers several partial solutions to the scenery problem. One system has been to project a scene or motion picture on a screen and then to photograph a live performance against the background of the projected scene. This system is useful in some applications but it often does not give the desired effect. Great difficulty has been encountered in maintaining the projected scene at the necessary brilliance and sharpness and at the same time maintaining the rest of the stage-set at the degree of illumination necessary for good photography.

Other systems use lenses and mirrors in varying arrangements in order to combine a live scene with either a projected scene or a miniature scene. Perhaps the most representative of the optical systems is that disclosed in U. S. Patent 2,076,103 to Walter Thorner.

In the Thorner system a projected image is reflected from a semi-transparent surface. The reflected image then strikes a large spherically-curved concave mirror which reflects the image back through the semi-transparent surface and focuses the image on the objective lens of a film-containing camera. A live performance takes place in front of the large concave mirror so the camera records the live performance against the background of the projected image.

Although the Thorner system serves very well for photographing short scenes under certain conditions, it suffers from three serious shortcomings. First, the cost of the large-sized, optically perfect, concave mirror, is so large as to be prohibitive. Second, any stray light striking the concave mirror is reflected to various points on the acting-set, thus the lighting of the live performance becomes a serious problem. Third, and perhaps most important, neither the camera nor the projector can be moved away from the focal point of the mirror; the position of both camera and projector are rigidly fixed at the focal point of whatever concave mirror is in use. Now in the staging of most performances it is essential that the camera have a certain freedom of movement. If viewer-interest is to be maintained the scene must not become monotonous; it must vary. Further, the build-up of suspense, the enhancing of dramatic values, and the emphasizing of certain characters, depends largely on the camera's ability to move in and out for close-ups and long shots, and to take up positions that will produce a maximum emotional impact on the viewer. A rigidly fixed camera can destroy whatever merit lies in a given scene. The talents of director and cameraman in trying to achieve the desired effects are largely rendered nugatory.

Accordingly, it is an object of this invention to provide apparatus whereby the above-mentioned shortcomings of the prior art are overcome.

It is a further object to provide apparatus for the simplified, cheap, and efficient production of motion picture or television performances.

It is a further object to provide apparatus whereby unusual effects may be readily and cheaply produced on motion picture or television sets.

Other objects will appear in the following description.

The apparatus, in accordance with the invention, includes at least one backdrop including a directionally reflecting surface known as a reflex light reflector. The staging of a show takes place on the acting-set in front of this backdrop. A camera for recording the performance is located at a convenient place in front of the backdrop. A sheet of plane transparent or semi-transparent material is positioned in front of the camera lens and between the camera and backdrop. A projector is so located that its light first strikes the plane transparent sheet. A portion of the light from the projector is thus reflected to the reflex reflecting screen that serves as a backdrop. The relative positions of the camera, the projector, and the plane transparent sheet are so adjusted that the lens of the camera receives both the reflected light from the projector and the light from the scene being enacted.

In the accompanying illustrative drawings:

Fig. 1 is a perspective view of a stage on which one arrangement of the apparatus of the present invention is shown in operation;

Fig. 2 is a diagrammatic representation of the stage showing the apparatus employed in its simplest form;

Fig. 3 is a diagrammatic representation showing another modification of the apparatus;

Fig. 4 is an enlarged section of the reflex reflecting screen showing the preferable type of reflecting units;

Fig. 5 is a diagrammatic representation showing another modification of the apparatus.

In all of the drawings the reflex reflecting screen is at 1. Since this screen constitutes an essential feature of the invention, and since the surprisingly great versatility of the present system depends on this screen, it will be discussed in some detail.

The screen should be large enough to encompass whatever projected background is desired. In some cases the screen may be long enough to serve as a backdrop for two or more adjoining sets; this application will be discussed later. If the screen is built so as to be flexible it will merely hang in the same way as any other flat curtain. Supports for the screen are not shown in the drawings.

The screen is so constructed that any light that strikes it is reflected back to the source. This can be accomplished in several ways. Fig. 4 shows an enlarged section of the screen illustrating the preferable way in which this can be done. Clear glass or resinous beads 9 of suitable index of refraction are imbedded in a binder coating 10. A reflector coating 11 reflects incident light rays 7 back through the refracting glass beads 9 to the source as shown by reflected ray 6. The back coating 12 strengthens the screen. Such a catadioptric system will return both paraxial and normal rays to their source.

Construction details may be varied to achieve maximum reflex reflection brilliancy consistent with wide angularity. Since the glass or resinous beads 9 can measure about 3 to 10 mils in diameter there are over 10,000 of them per square inch of screen surface.

Screens of the type described above in connection with Fig. 4, have been long known in the art as reflex reflector screens, having been described, for instance, in Palmquist Patents Nos. 2,294,930 and 2,379,741. In such reflex reflector screens, an outer layer of adjacent transparent bead or sphere-like lens elements with underlying light reflecting elements which are in optical connection therewith cause beams of light incident on the outer layer to be refracted and reflected as brilliant cones of light in a direction generally coaxial with the incident light beams throughout the range of angular relations of the layer surface and the direction of the incident light between 90° and about 50°. Any of the reflex reflector screens operative in the manner described above may be used for the reflector surface of the reflector structure 1 of the system of the invention.

In Fig. 1, the projector 3 throws light on a sheet of plane transparent or semi-transparent material 4. A portion of the light passes right through the sheet and is unused in this arrangement. The remainder of the light however is reflected to the reflex reflecting screen 1. With the proper focus on the projector 3 an image will be formed on the screen 1. This image will appear clear and sharp to the camera 5 since the camera 5 is positioned to the rear of the sheet 4 and is located near the apparent source of light from the projector 3. Thus the actors 2 can be photographed in action against whatever background scene is desired. The light reflected from sheet 4 does not adversely affect the photography of the actors 2 even though the light strikes the actors 2 on the side that is being photographed. The light is not in sharp focus on the actors 2 and is diffusedly reflected from them. Hence the effect of this reflected light is negligible; in practice it is unnoticeable.

The apparatus functions just as well when the projector 3, the sheet 4, and the camera 5 move in toward the actors 2 for a close-up, or back away from the actors 2 for a long shot. The focus of projector 3 and camera 5 are easily adjusted by means well-known in he art. If a projector possessing a considerable depth of focus is used, it may be unnecessary to vary the focal adjustment of the projector at all. In any case the image reflected from the screen 1 presents a startling illusion of depth. Thus the actors 2 appear to perform in the midst of actual scenery. In Fig. 1 the projector 3, the sheet 4, and the camera 5 are all shown mounted as a unit on the dolly 15. Hence close-ups, long shots, and angle shots may readily be taken without interrupting the photography.

Under some conditions it may be necessary to prevent the back side of the plane transparent sheet 4 (the side nearest the camera 5) from receiving extraneous light from other portions of the set. This can easily be done when necessary by putting up a curtain or drop to block off stray light.

Not only may the camera 5 move in and out from the screen 1 in accordance with the present system, it may also move to one side or the other for angle shots. Thus the camera 5 records excellent scenes when light reflected from the sheet 4 strikes the reflex reflecting screen 1 at an angle of 40° to the normal. Even greater angles may be used but care must be taken not to exceed the angle at which the brilliancy of the reflected image falls below that required for good photography. This maximum angle depends on the characteristics of the particular reflex reflecting screen in use; it usually runs around 40° to normal.

The apparatus of the present invention possesses another important advantage. Fig. 2 is a diagrammatic plan view of Fig. 1, showing the employment of stage lights 13. The lights 13 may be used freely as the director sees fit since they will not adversely affect the photography so long as they do not shine directly into the objective lens of the camera 5. Light from the stage lights 13 that strikes the reflex reflecting screen 1 will not be reflected to the camera 5, but rather back to the stage lights 13. Light striking the sheet 4 will not be reflected to that portion of the screen 1 that is being photographed by the camera 5. Thus in addition to reducing the problem of handling scenery, the present invention does away with many lighting problems.

Fig. 3 is a diagrammatic plan view showing the apparatus of the present invention set up in a modified arrangement that utilizes the entire beam from the projector 3, instead of merely a portion. The screen 1, projector 3, sheet 4, and camera 5, function in the same way as described before. In addition a smaller reflex reflecting screen 1' reflects an image focused on it by lens 5'. This image originates from the unreflected light that passes through sheet 4 from the projector 3. Thus the camera 5 sees two matching images, a large one from the acting-set screen 1 and a small one from the miniature-set screen 1'. If necessary, the brightness of the two images may be matched by means known to the art.

With such an arrangement it becomes possible to achieve unusual realism without resort to the actual handling of scenery. For example shutters 14 mask the left-hand quarter of the acting-set and the right-hand three-quarters of the miniature set. Instead of the shutters 14 as shown it may be advisable to position black masks directly over the surface of screens 1 and 1'. In this way a sharp dividing line may be obtained in the final composite image. The camera 5 still sees a complete set. The dividing line between the two scenes that make up the composite image may be the projected image of, say, a doorway seen from an angle. Now an actor 2 positioned on the portion of the acting-set masked by shutters 14 will be invisible in the composite image until he walks over to the unmasked portion of the acting-set. When he does so he will appear to have entered the set through the door. The shutters 14 may then be shifted to fully expose the acting-set and completely mask the miniature-set. The actor may then return to his original position, only this time he will appear to be in front of the door through which he has just entered. Thus realism is obtained without the necessity of constructing a room complete with doors. At the same time appropriate props like desks, chairs, tables, beds, and the like, may be placed on the acting-set as part of the scene whenever necessary. Since these objects are diffuse reflectors the light reflected from sheet 4 does not cause the objects to look mottled when photographed by the camera 5.

In similar fashion it is possible to obtain a composite image made up of the top portion of the miniature-set and the bottom portion of the acting-set. In fact any portion of the acting-set can be masked so long as the corresponding portion of the miniature-set is unmasked. Thus if it is desirable to show an actor going behind a building and coming out on the other side, the central portion of the acting-set can be masked while the miniature-set supplies the image of the building that apparently occupies the masked portion of the acting-set. Many other modifications will be obvious to those skilled in the art. Suitable shutters may be installed whenever the matching of opposing portions becomes desirable.

The addition of a miniature-set as described above in no way affects the ability of the camera 5 to move to the most suitable position; close-ups, long shots, and angle shots can still be taken. For this purpose it may be well to have the projector 3, sheet 4, camera 5, lens 5', miniature-set 1', and shutters 14, all mounted on the same dolly. Thus the installation can move as a unit.

If desired, the screen 1' may be the same size as the screen 1, and located the same distance from sheet 4 as is screen 1. The lens system 5' thus becomes unnecessary.

Two full-size acting-sets become available, one in front of screen 1 and one in front of large-size screen 1'. This arrangement may be particularly desirable where weird effects are needed as in the production of a science-fiction shown. For example, performers can be shown to walk through one another.

Fig. 5 shows two other modifications of the apparatus of the present invention. Reflex reflecting screen 1" may be positioned as a wing partly in front of the reflex reflecting screen 1; both screens are of the same construction. An actor 2 will be unseen until he steps out from behind screen 1". Such an arrangement provides still another method that enables an actor 2 to enter the acting-set through a projected door, in which case the projected door should coincide with the on-stage end of screen 1". Projector 3 should have sufficient depth of focus so that the images reflected from screens 1 and 1" are matching in clarity and sharpness.

At the same time that projector 3 is supplying a background scene visible to the camera 5, projector 3' may also supply a different background scene. Since the light from projector 3' strikes the sheet 4 at an angle different from that of projector 3, the camera 5 will not see the image from projector 3' unless the camera 5 shifts its position relative to sheet 4, that is, unless the camera 5 rotates counterclockwise on its vertical axis. Thus an actor may perform against the background of an image from projector 3. He may then move along the set parallel to screen 1 and away from screen 1". The camera 5 rotates independently to keep him in view. When the actor 2 reaches the proper position the camera 5 will see the actor against the background of an image from projector 3' instead of from projector 3. Thus the set has been changed with a minimum of effort and expense. The camera 5 has been continuously trained on the actor; there is no necessity for a fade-out.

Although Fig. 5 shows the projectors 3 and 3' positioned to the left of camera 5 they need not be placed there. A projector may be positioned anywhere on the set so long as sheet 4 is so located that the projected image appearing on screen 1 can be seen by the camera 5. A projector may be positioned near one end of screen 1, or at the top of screen 1 for that matter. If a battery of projectors is used each projector of necessity must be located at a different position just off-stage from the acting-set. The apparent distance between a projector and the image on the reflex reflecting screen should be approximately the same as the actual distance between the camera and the image on the reflex reflecting screen.

A projector in the apparatus of the present invention may be of any convenient type. In its simplest form it may simply be a source of light, as when a performance against a gleaming background is desired. A projector may also consist of either a still or motion picture projector, depending on the type of background desired. The projector may contain means for the rapid changing of the slides to be projected as scenery. The slides can be changed sufficiently rapidly that a viewer is not aware of the change until it is an accomplished fact. Thus, if necessary, as the projector, camera, and plane transparent sheet move forward for a close-up the slides may be changed to show a successively smaller area of the same background scene. In this way proper perspective is maintained; the size relationship between the actors and the projected background scene is maintained at a proper ratio. The projector may also contain means for varying the angularity of the slides, that is, the slides may be partially rotated around their vertical axis in order to prevent fuzziness around the edges of the image on the reflex reflecting screen when the projector throws an image to the screen at an angle thereto. Or a projector may consist of a television tube confronted with a lens system to focus the tube's image on the reflex reflecting screen. By "television tube," as used in the claims, is meant the type of cathode-ray tube commonly used in television receivers. By means of this last arrangement a composite picture can be made up from two distinct sets on each of which action or movement takes place. By way of example, one television camera may be focused on a bowl of water into which has been dropped some solid carbon dioxide. The resulting dense white fog will appear on the television tube that serves as a projector for the present invention. Thus the actors on the acting-set can be photographed in the midst of a swirling fog by using the arrangement illustrated in Fig. 3; the shutters 14 are unnecessary in this application.

The plane transparent sheet in the apparatus of the present invention may be of any convenient size. A too-large sheet works no hardship since the portion not used for reflection does not interfere with operations. The sheet may be made of glass or suitable resinous material. Although preferably the sheet is perfectly transparent it may be lightly silvered so as to render it semi-transparent. In fact if a projector is positioned near the center and top of the reflex reflecting screen the sheet should preferably be lightly silvered in order to reflect sufficient light to form an image on the reflex reflecting screen. Any suitable means may be used for holding the sheet in the desired position; adjustable or fixed mounts may be employed. If a thick sheet is used one face of it may be coated with a non-reflecting coating to avoid the possibility of a double image, although this difficulty has not been encountered in practice. The phrase "plane transparent sheet" as used in the claims is meant to include a plane semi-transparent sheet.

Several types of cameras may be used in the present invention. A still picture camera can be used for the taking of publicity or advertising stills. A motion picture camera can be used and the film that is obtained can be later displayed in the usual way either in a motion picture theater or in a television broadcast. Or the camera may be a television transmitter that instantly televises the scene being photographed. The phrase "camera having an objective lens" as used in the claims is meant to include a television transmitter, a motion picture camera, and a still picture camera.

In some applications of the present invention it may be expedient to exchange the positions of the camera and the projector. With this arrangement the projector throws an image through the plane transparent sheet and on to the reflex reflecting screen. The camera then photographs the image that is reflected to it by the plane transparent sheet. Since the camera can also see through the plane transparent sheet, a blank drop of some kind may be positioned in the camera's line of sight beyond the plane transparent sheet when a miniature-set is not in place.

The composite images obtained by the apparatus of the present invention are blended optically, not electronically, thus eliminating the disastrous phenomenon known as halo. The composition of the final image is completely under the control of the cameraman who is in the best position to exercise judgment as to the merits of the final image.

Further applications of the present invention may readily be found without departing from its spirit and scope. The versatility of the invention allows numerous embodiments, therefore the invention should not be limited by the specific applications described herein, but only by the appended claims.

I claim:

1. In combination: at least one reflecting structure having an extended reflecting surface, a camera having an objective lens with an optical axis crossing said reflecting surface and so positioned as to simultaneously record both an image focused on said reflecting surface and an image of a performance on an acting-set situated between said reflecting surface and said camera, a substantially plane transparent mirror body extending at an angle to said optical axis between said camera and said reflecting surface for reflecting incident light received from a lateral direction transverse to said axis toward said reflecting surface, at least one image projector so positioned that the projector's light impinges on said mirror body from said lateral direction and is focused by said mirror body on said reflecting surface, and an acting-set situated between said reflecting surface and said mirror body, the exterior of said reflecting surface directly facing said camera having a light returning layer of adjacent transparent minute lens elements and underlying light reflecting elements in optical connection with said lens elements for causing beams of light from said projector incident on said layer to be refracted and reflected as brilliant cones of light in a direction generally coaxial with said beams toward said camera for causing said camera to record said brilliant cones throughout the angular positions of said reflecting surface relatively to said optical axis ranging between 90° and at least 60°.

2. In the combination as claimed in claim 1, a further reflecting structure having a further reflecting surface of similar light reflecting properties as said extended reflecting surface and positioned to receive light of said projector passing through said transparent mirror body and arranged to reflect received light back onto said mirror body, said camera having an objective lens system arranged to record a composite image comprising a performance taking place on said acting-set and the projected light reflected by said two reflecting surfaces.

3. In the combination as claimed in claim 2, a further acting-set positioned between said mirror body and said further reflecting surface, said camera having an objective lens system arranged to record a composite image comprising performances taking place on said two acting-sets and the projected light focused on said two reflecting surfaces.

4. In the combination as claimed in claim 1, a further reflecting structure of substantially smaller size than said one reflecting structure having a further reflecting surface of similar light reflecting properties as said extended reflecting surface, a lens arrangement positioned between said mirror body and further reflecting surface for focusing a portion of the projected light passing through said mirror body onto said further reflecting surface, said camera having an objective lens system arranged to record a composite image comprising a performance taking place on said acting-set and the projected light reflected by said two reflecting surfaces.

5. In the combination as claimed in claim 1, a further reflecting structure of substantially smaller size than said one reflecting structure having a further reflecting surface of similar light reflecting properties as said extended reflecting surface, a lens arrangement positioned between said mirror body and said further reflecting surface for focusing a portion of the projected light passing through said mirror body onto said further reflecting surface, a miniature-set positioned between said lens system and said further reflecting surface, first masking elements arranged to mask a portion of said acting-set, further masking elements arranged to mask that portion of said miniature set that corresponds to the unmasked portion of said acting-set, said camera having an objective lens system arranged to record a composite image comprising performances taking place on said acting-sets and the remaining projected light focused on said further reflecting screen.

6. The combination according to claim 1 wherein the said projector comprises a motion picture projector.

7. The combination according to claim 1 wherein the said projector comprises a still picture projector.

8. The combination according to claim 1 wherein the said projector comprises a television tube confronted by a lens system.

References Cited in the file of this patent

UNITED STATES PATENTS

| | | |
|---|---|---|
| 1,122,192 | Clark | Dec. 22, 1914 |
| 1,150,869 | Lewin | Aug. 24, 1915 |
| 1,301,538 | Brainerd | Apr. 22, 1919 |
| 1,418,033 | Sutcliffe | May 30, 1922 |
| 1,526,715 | Moon et al. | Feb. 17, 1925 |
| 1,636,112 | Schufftan | July 19, 1927 |
| 1,720,232 | North | July 9, 1929 |
| 1,806,864 | Pallemaerts | May 26, 1931 |
| 1,998,054 | McBurney | Apr. 16, 1935 |
| 2,076,103 | Thorner | Apr. 6, 1937 |
| 2,169,045 | Haskin | Aug. 8, 1939 |
| 2,553,903 | Dufour | May 22, 1951 |

FOREIGN PATENTS

| | | |
|---|---|---|
| 598,712 | Germany | June 18, 1934 |
| 475,312 | Great Britain | Nov. 17, 1937 |